United States Patent Office 3,323,534
Patented June 6, 1967

3,323,534
SYSTEMS FOR CONTROLLING DISTRIBUTION
OF LOADS
Ivan Boris David Johnson, Guildford, and William Vernon Ellis, Bramley, England, assignors to S. Smith & Sons (England) Limited, London, England, a British company
Filed Aug. 10, 1964, Ser. No. 388,647
Claims priority, application Great Britain, Aug. 14, 1963, 32,205/63
15 Claims. (Cl. 137—101.21)

This invention relates to systems for controlling distribution of loads.

The present invention is particularly, although not exclusively, concerned with systems for controlling the distribution of liquid fuel between a group of fuel tanks of an aircraft where the distribution, for example for reasons of trim of the aircraft, is to be in accordance with a predetermined order of preference as between the tanks.

In this latter connection for example, a specific requirement has been found to exist for a system for controlling the refuelling of a group of three fuel tanks of an aircraft where the group is to be refuelled (a) with a selected mass of fuel, (b) with a specified order of preference as between the three tanks, and (c) without waste of time that would result from waiting until one tank is full before refueling the next one in the order of preference. Of these three conditions, condition (b) imposes the requirement that if the fuel load is less than that which will fill the first tank (first in the order of preference), then all of it shall be contained by the first tank, whereas if the fuel load is larger than this, the first tank shall be filled and the excess contained, as far as possible, in the second tank (second in the order of preference), any remaining excess being contained in the third tank. Because the amount of fuel which can be carried by any tank is limited by volume, and the density of the fuel varies from one refuelling operation to another, the exact mass which can be contained by any of the three tanks is not known. There is therefore, the disadvantage that the exact mass-distribution as between the three tanks which is to be achieved by any refuelling operation is in general not known exactly until the first, or each of the first and second tanks, is full, and this tends to prolong the time required to complete the refuelling operation. It is an object of the present invention to provide a system which may be used to control the refuelling operation such as to tend to complete it in a minimum time.

According to one aspect of the present invetnion a system for controlling distribution of a load between a plurality of containers, comprises pre-selector means which is adapted to be set in accordance with a desired total load for the containers, and means which is arranged to be responsive to the setting of said pre-selector means and which, if the desired total load exceeds that which will fill a first of the containers to a predetermined limit, effects adjustment of the load-content of the containers concurrently. The adjustment effected is such that, on the one hand, the load-content of said first container is adjusted towards its limit, and, on the other hand, the load-content of a second of the containers is adjusted towards a first value until said first container is filled to its limit and then towards a second value (in general different from said first value) when said first container is filled to its limit. The said first value is a value which would be appropriate for the load-content of the second container in the event that a predetermined maximum value of load-content applied in respect of the first container, and said second value is the actual value appropriate to the load-content of the second container when the first container is full.

In the event that there are three containers or more and the desired total load represented by the setting of the pre-selector means exceeds that which will fill the first and second containers to their limits, then the load-content of all three containers is adjusted concurrently, the load-contents of the first and second containers being both adjusted towards their limits. The load content of the third container is adjusted initially towards a first value until one or other of the first and second containers is full, then towards a second value until the other of the first and second containers is full and then finally towards a third value which is in general different from either said first or second value. The first value to which the load-content of the third container is adjusted is the value which would be appropriate to the load-content of said third container in the event that predetermined maximum values of load-content applied in respect of the first and second containers respectively. The second value, on the other hand, is the value appropriate to the load-content of the third container based on the actual value of load-content of whichever of the first and second containers is the first to fill and the said maximum value of the other, whereas the third value is the actual value appropriate to the load-content of the third container.

According to a feature of the present invention a system for controlling distribution of liquid fuel between at least first and second fuel tanks, includes: first means which is adapted to be set in accordance with a desired total mass of fuel to be contained by the tanks, and second means which controls supply of fuel to the first tank and which is responsive to the condition in which the first tank is full to break the supply. Third means provides in respect of the first tank one or the other of two measures of fuel-mass in dependence upon whether or not the first tank is full, a first of the two measures being provided when the tank is not full and being a measure of a predetermined maximum mass of the fuel which the first tank can contain, and the second measure being provided by said third means when the first tank is full and being a measure of the actual mass of fuel which the first tank contains. Fourth means provides a measure of the actual mass of fuel contained by the second tank, and fifth means controls supply of fuel to the second tank such that fuel is supplied to the second tank only so long as the sum of the two masses of fuel which are represented by the two measures actually provided as aforesaid by the third and fourth means respectively, is less than the desired total mass which is represented by the setting of said first means.

According to another aspect of the present invention a system for controlling distribution of a load between a plurality of containers, includes first means settable in accordance with a desired total load to be contained by said containers and arranged to provide a signal in accordance with the setting made, and second means for providing a measure of the actual content of a first of the containers. Third means, responsive to the signal provided by the first means and the measure provided by the second means, adjusts the content of the first container in a sense to reduce towards zero any difference between the actual content of the first container and the desired total load. Fourth means associated with the first container supplies a signal in accordance with a value for content of the first container, this value being the value of the actual content of the first container when the first container is full, but being otherwise a predetermined value for the maximum possible content of the first container. Fifth means provides a measure of the actual content of a second of the containers, and sixth means responsive to the signal supplied by the fourth means and the measure provided by the fifth means supplies a signal in accordance with the sum of the actual content of the second container and the content of the first container as represented by the signal from the fourth means. Seventh means, responsive to the signals provided by said first and sixth means, adjusts the content of the second container in a sense to reduce towards zero any difference between said sum and said desired total load.

A system in accordance with the present invention for controlling the distribution of liquid fuel between a group of fuel tanks of an aircraft, will now be described, by way of example, with reference to the accompanying drawings, in which.

Figure 1:
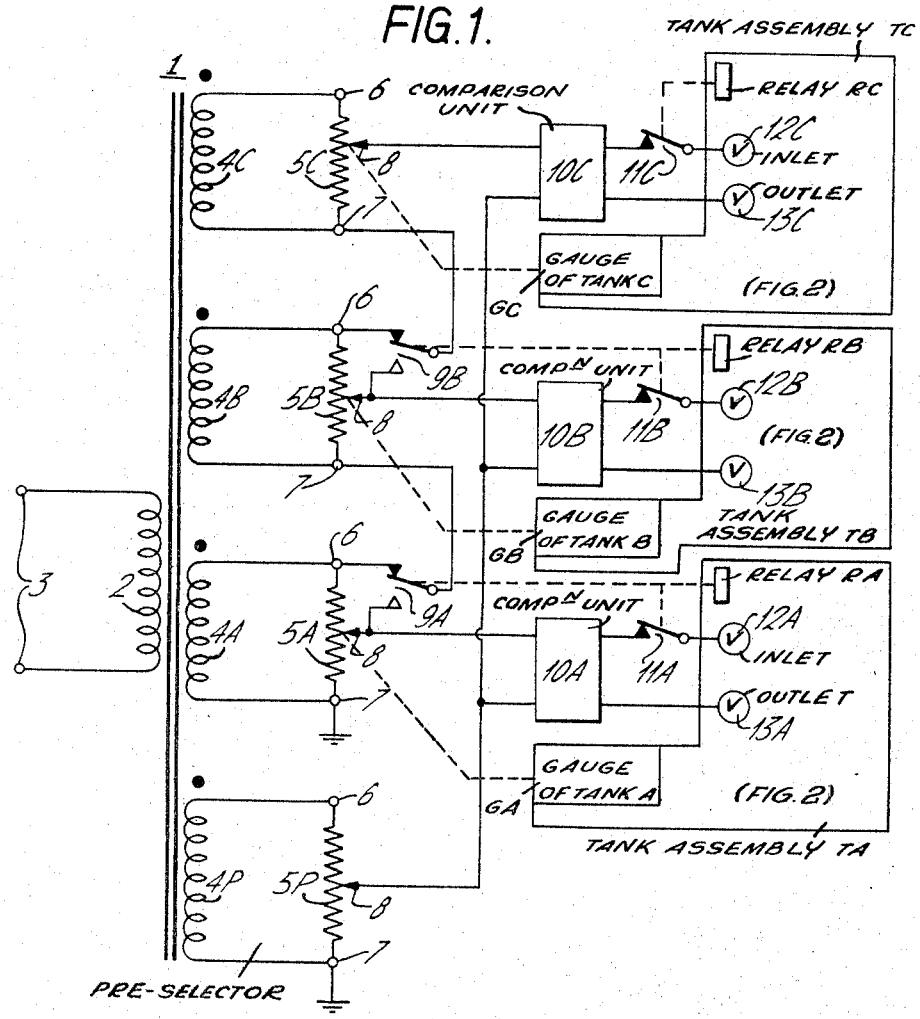
FIGURE 1 shows the electrical circuit of the system.

The system shown in the drawings is for use in an aircraft having a group of three fuel tanks which are referred to for convenience as tanks A, B, and C. The fuel load which is to be carried by the group of tanks A, B, and C is specified in terms of its mass, and, for reasons of trim of the aircraft, is to be distributed in accordance with the following conditions:

(i) if the fuel load is not in excess of that which can be contained by tank A, all of it shall be contained by tank A; and (ii) if the fuel load is in excess of that which can be contained by tank A alone, tank A shall be filled to capacity and the excess shall be contained as far as possible by tank B, any excess over that which fills tanks A and B to capacity being contained with tank C.

Obviously if the mass of fuel which would fill tanks A and B to capacity were known exactly, it would be a simple matter in each case to deduce the exact amounts which in accordance with the above conditions are to be contained by the different tanks. This would enable a refueling operation to be carried out in the minimum time since all three tanks A, B, and C could be refuelled to the required amounts concurrently without break. Unfortunately, it is not possible to have knowledge of the exact mass of fuel which can be contained within any tank, because this value varies with the inevitable variation in density of the fuel.

Since the exact masses of fuel which can be contained by the tanks individually are not known, delays are in general introduced into refuelling operations by the need, which is imposed by the above conditions, to await the filling of one tank before the content of another can be brought to the appropriate mass. The system to be described is intended to reduce these delays to a minimum, and achieves this object using information as to the maximum mass of fuel which can possibly be contained by each tank. Such information, for example, can be deduced from knowledge of the volume of each tank and also the maximum fuel-density which is met in practice. In the following description of the system the maximum masses of fuel which can possibly be contained by the three tanks A, B, and C are represented as $M_A$, $M_B$, and $M_C$ respectively and their total $(M_A+M_B+M_C)$, as $M_P$.

Referring to FIGURE 1, a transformer 1 has, in addition to a primary winding 2 which is connected across a pair of terminals 3, four secondary windings 4 which are referred to individually as windings 4P, 4A, 4B, and 4C. The turns ratios relative to the winding 2 of the windings 4 are such that when in operation alternating current, having a frequency of four hundred cycles per second, is applied across the terminals 3, the voltages induced in the windings 4P, 4A, 4B, and 4C provide respectively measures of the maximum masses $M_P$, $M_A$, $M_B$, and $M_C$. The voltages induced in the four windings 4P, 4A, 4B, and 4C are applied to four potentiometers 5P, 5A, 5B, and 5C respectively. Each potentiometer 5 has a pair of terminals 6 and 7, and a movable tap 8, the voltage from the relevant winding 4 being applied to the potentiometer 5 across its terminals 6 and 7.

The potentiometer 5P is in the nature of a pre-selector with the tap 8 thereof arranged to be set manually in accordance with the desired total mass $m_P$ of fuel which is to be contained by the group of three tanks A, B, and C. The setting is adjustable anywhere within the limits corresponding to zero mass and the maximum total mass $M_P$. The voltage which in the potentiometer 5P appears between the tap 8 and the terminal 7 (which terminal is connected directly to ground) provides in accordance with the setting a measure of the desired total mass $m_P$.

The potentiometers 5A, 5B and 5C, in contrast to the potentiometer 5P, have their taps 8 automatically set in accordance with the actual masses of fuel contained in the tanks A, B, and C. In this respect, the potentiometer 5A is associated with fuel-contents gauging apparatus GA of tank assembly TA which is provided with the tank A as part of the normal equipment of the aircraft. The tap 8 of the potentiometer 5A is set by the fuel-contents gauging apparatus so that the voltage which appears between it and the terminal 7 of the potentiometer 5A provides a measure of the mass $m_A$ of fuel actually contained by the tank A. The potentiometers 5B and 5C are similarly associated with tank assemblies TB and TC including fuel-contents gauging apparatus GB and GC for the tanks B and C respectively, so that each has its tap 8 set automatically in accordance with the actual mass $m_B$ or $m_C$ of the relevant tank. Thus the voltage which appears between the tap 8 and terminal 7 of the potentiometer 5B provides a measure of the mass $m_B$, and the corresponding voltage of the potentiometer 5C a measure of the mass $m_C$.

Figure 2:
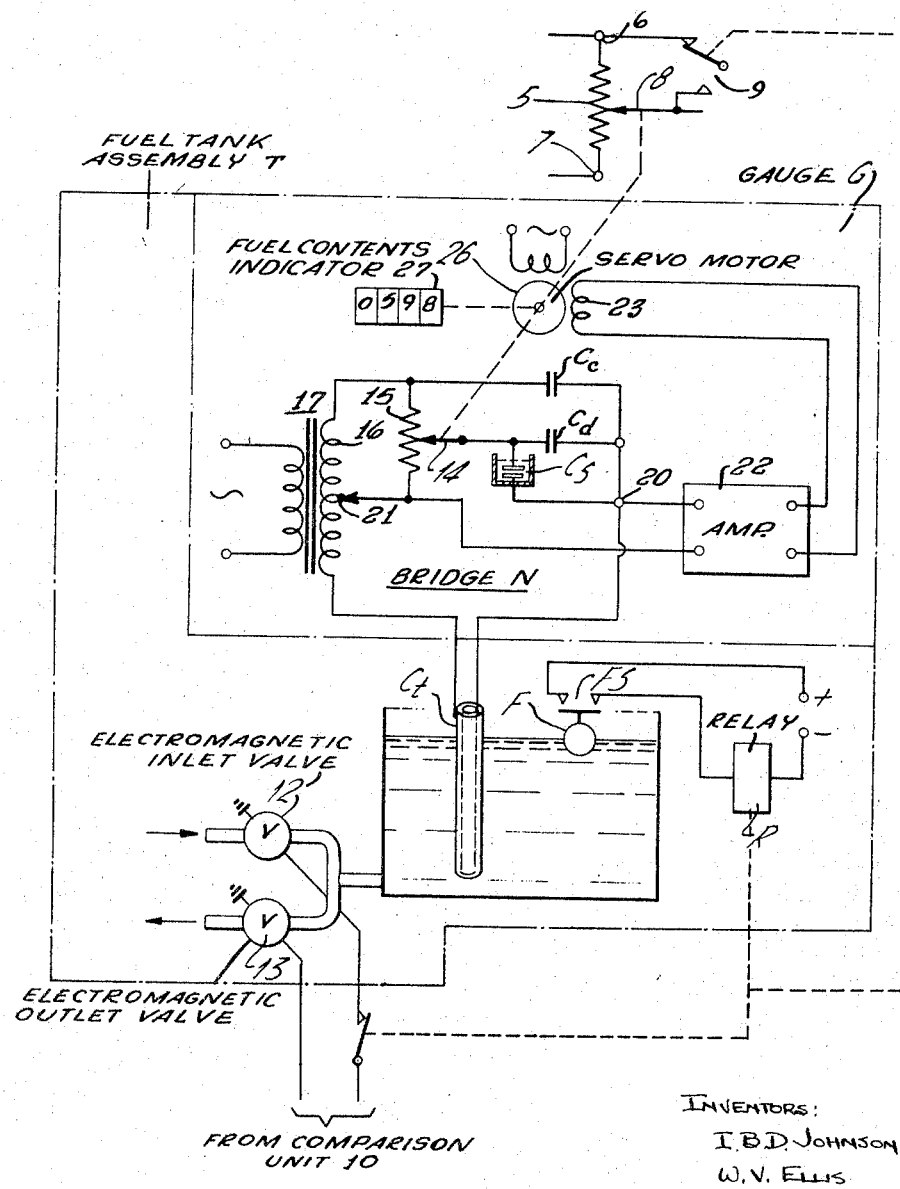
FIGURE 2 shows the manner in which each of three sections of the circuit of FIGURE 1 is associated with respective fuel-contents gauging apparatus of the aircraft.

Each fuel-contents gauging apparatus may be, for example, of the kind described in British patent specification No. 695,074, or U.S. Patent No. 3,037,385, issued June 5, 1962, to R. M. Franzel and A. C. Smith. More specifically, each tank assembly and its gauging apparatus may be as represented respectively as assembly T and apparatus G in FIGURE 2 of the drawings accompanying the present specification. The fuel-contents gauging apparatus G includes an electrical capacitance bridge network N in which tank-probe capacitance $C_t$ that is dependent upon volume of fuel in the tank is compared with capacitance that is independent of volume to provide a measure of mass of fuel-content. This latter capacitance is provided by three parallel-connected capacitors $C_c$, $C_d$ and $C_s$. Compensation for variation in fuel density is provided in the capacitance value by means of the immersed reference capacitor $C_s$ which is connected in parallel with the capacitor $C_d$ to the tap 14 of a potentiometer 15 in the bridge network N. The potentiometer 15 and capacitor $C_c$ are both supplied with an alternating current signal of the same amplitude as, but of opposite phase to, and alternating current signal supplied to the tank-probe capacitance $C_t$, the two signals being supplied from opposite ends of a center-tapped secondary winding 16 of a transformer 17 in the network N. The resulting difference signals appearing between a common point 20 of the bridge network N and the center-tap 21 of the winding 16 is passed via a servo amplifier 22 to the control-phase winding 23 of a two-phase servo motor 26. The motor 26, in response to this difference signal, drives the potentiometer tap 14 in the sense to reduce the signal to zero and thereby rebalance the bridge network N. The motor 26 also drives a digital counter indicator 27 to indicate the fuel-mass represented by the rebalanced position. In the case of each tank A, B, and C, and as shown in FIGURE 2, the tap 8 of the relevant potentiometer 5 is coupled to the servo motor 26 to be driven in the same manner as the potentiometer 14 and indicator 27 of the associated fuel-gauging apparatus G.

Referring again especially to FIGURE 1, two sets of relay contacts 9A and 9B, which are respectively effective to connect the potentiometer 5B to the potentiometer 5A and the potentiometer 5C to the potentiometer 5B, belong to relays RA and RB that are arranged to be energized only when the tanks A and B respectively are filled to capacity. The set of contacts 9A is in a first (as shown) of two operative conditions while the relay RA is not energized, that is to say while the tank A is not full, and in this condition is effective to connect the terminal 7 of the potentiometer 5B to the terminal 6 of the potentiometer 5A. When, on the other hand, the tank A is full, the relay RA is energized, with the result that the set of contacts 9A is then held in its second condition for which it is effective to connect the terminal 7 of the potentiometer 5B to the tap 8, rather than to the terminal 6, of the potentiometer 5A. The terminal 7 of the potentiometer 5A is connected directly to ground so the voltage which appears between the tap 8 of the potentiometer 5B and ground provides a measure of $(M_A+m_B)$ when the tank A is not full, and of $(m_A+m_B)$ when it is full.

The set of contacts 9B is operated in a similar manner to the set of contacts 9A, the set of contacts 9B being in a first condition (as shown) while the relay RB is not energized, that is to say while the tank B is not full, and in the second condition while the tank B is full and the relay is in consequence energized. In its first condition the set of contacts 9B is effective to connect the terminal 7 of the potentiometer 5C to the terminal 6 of the potentiometer 5B, whereas in its second condition it is effective to connect the terminal 7 to the tap 8 of the potentiometer 5B. The voltage which appears between the tap 8 of the potentiometer 5C and ground therefore provides a measure of $(M_A+M_B+m_C)$ when neither of the tanks A and B is full, of $(m_A+M_B+m_C)$ or $(M_A+m_B+m_C)$ when tank A or tank B is full, and of $(m_A+m_B+m_C)$ when both tanks A and B are full.

The voltages with respect to ground at the taps 8 of the three potentiometers 5A, 5B, and 5C, are compared in respective amplitude comparison, or control units 10A, 10B, and 10C with the voltage with respect to ground at the tap 8 of the pre-selector potentiometer 5P. The control units 10A, 10B, and 10C control inaccordance with the results of the comparisons the supply of fuel to, and the withdrawal of fuel from, the tanks A, B, and C respectively, in the assemblies TA, TB and TC. In this respect, when the voltage at the tap 8 of the potentiometer 5A is less than that at the tap 8 of potentiometer 5P, the control unit 10A supplies, via a relay contact 11A, electric current to energize, and thereby open, an electromagnetically-actuated fuel-supply valve 12A for the tank A. When the voltage at the tap 8 of the potentiometer 5A is larger than that at the tap 8 of the potentiometer 5P, however, the control unit 10A instead supplies electric current to energize, and thereby open, an electromagnetically-actuated fuel-withdrawal valve 13A for the tank A. The control unit 10A does not supply energization current to either valve 12A or 13A when the two voltages are substantially the same as one another. Thus the control unit 10A operates to effect fuelling of the tank A via the valve 12A only when the measure of fuel-mass provided by the voltage at the tap 8 of the potentiometer 5A is less than the measure of the desired total fuel-mass provided by the voltage at the tap 8 of the potentiometer 5P, and to effect defuelling of the tank A via the valve 13A only when the reverse is true.

The control units 10B and 10C operate in a similar manner to the unit 10A. The control unit 10B effects fuelling of the tank B via a valve 12B, or defuelling of the tank B via a valve 13B, according to whether the measure of fuel-mass provided by the voltage at the tap 8 of the potentiometer 5B, or the measure of desired total fuel-mass $m_P$ provided by the potentiometer 5P, is the lesser. The control unit 10C on the other hand effects fuelling of the tank C via a valve 12C, or defuelling of the tank C via a valve 13C, according to whether the measure of fuel-mass provided by the voltage at the tap 8 of the potentiometer 5C, or the measure of desired total fuel-mass $m_P$, is the lesser.

The paths via which energizing currents are supplied from the control units 10B and 10C to the valves 12B and 12C include individual relay contacts 11B and 11C corresponding to the contact 11A. The contacts 11A and 11B belong to the same two relays RA and RB referred to above in connection with the sets of contacts 9A and 9B, and are each arranged to open, thereby breaking the supply to the relevant valve 12A or 12B when its relay RA or RB becomes energized. The contact 11C similarly belongs to a relay RC which, like relays RA and RB, is energized only when the associated tank, in this case tank C, is full. When relay RC is energized this opens contact 11C thereby breaking the supply to the valve 12C. Thus, contacts 11A, 11B, and 11C remain closed until such time as the tanks A, B, and C respectively are full, whereupon they open, breaking the further supply of fuel to their respectively associated tanks.

Each relay RA, RB, and RC may be arranged in the manner of the relay R shown in FIGURE 2, to be energized in response to closure of a set of contacts FS associated with a float F in the relevant fuel tank. The contacts FS are closed under the action of the float F only when the tank is full and this completes an energized circuit of the relay R, thereby actuating the relevant contacts 11 and, in the case of relays RA and RB, contacts 9 also.

The operation of the system will now be described assuming, for example, that all three tanks A, B, and C are empty, and that the tap 8 of the pre-selector potentiometer 5P is set to a desired total mass $m_P$ which is in excess of the maximum mass $(M_A+M_B)$ which can be contained in the tanks A and B together. Initially the sets of contacts 9A and 9B are both in their first condition so that the voltages with respect to ground of the taps 8 of the potentiometers 5A, 5B, and 5C provide respectively measures of:

$$m_A$$
$$(M_A+m_B)$$
$$(M_A+M_B+m_B)$$

where $m_A$, $m_B$ and $m_C$ are all zero. These measures are all less than the measure of desired total mass $m_P$ provided by the voltage with respect to ground the tap 8 of the potentiomter 5P, and accordingly the control units 10A, 10B, and 10C effect energization of the valves 12A, 12B, and 12C. Fuel is in consequence supplied to all tanks A, B, and C concurrently, and the measures of masses $m_A$, $m_B$, and $m_C$ steadily increase as fuelling proceeds.

Eventually, with the increase in fuel-content of the tank C, the measure of mass $(M_A+M_B+m_C)$ provided by the voltage at the tap 8 of the potentiometer 5C becomes the same as that of the desired total mass $m_P$ provided by the voltage at the tap 8 of the potentiometer 5P. The control unit 10C detects this condition and ceases to supply energization current to the valve 12C, with the result that the supply of fuel to the tank C is broken. The supply of fuel to the tanks A and B however, continues.

If, of the two tanks A and B, the tank A is the first to fill, the relay RA, having contacts 9A and 11A, next becomes energized. The consequent opening of the contact 11A breaks the supply of energization current to the valve 12A and thereby prevents further fuel being supplied to the tank A. In this connection attention is drawn to the fact that the break in supply of fuel to the tank A takes place even though the control unit 10A might otherwise continue to supply energization current to the valve 12A. This is of course essential since the particular mass $m'_A$ of fuel in the full tank A is in general, and as assumed in the present example, less than the desired total mass $m_P$ with which it is compared by the control unit 10A.

The change in condition of the set of contacts 9A which results from the tank A becoming full, causes (assuming that the mass $m'_A$ is not equal to the maximum mass $M_A$) change in the voltages with respect to earth at taps 8 of the potentiometers 5B and 5C. In both cases the voltage change corresponds to a decrease of $(M_A - m'_A)$ in the measure provided. In the case of the voltage at the tap 8 of the potentiometer 5B this decrease does not result in any change in the supply of fuel to the tank B, this voltage now providing a measure of $(m'_A + m_B)$. However in the case of the voltage at the tap 8 of the potentiometer 5C, the decrease restores the condition in which this voltage, now providing a measure of $(m'_A + M_B + m_C)$, is less than the voltage at the tap 8 of the potentiometer 5P. The control unit 10C therefore again supplies energization current to the valve 12C so that fuelling of the tank C is continued.

If of the tanks B and C now being fuelled, tank B is filled before the mass $m_C$ of fuel in the tank C is brought to a value such that:

$$(m'_A + M_B + m_C) = m_P$$

the supply of fuel to the tank B is the next to be broken. The break in supply of fuel to the tank B results from opening of the contact 11B and the consequent break in the supply of energization current to the valve 12B, when the tank B becomes full. At the same time there is a change in condition of the set of contacts 9B, and (assuming that the mass $m'_B$ of fuel in the full tank B is not equal to the maximum mass $M_B$) this causes a change in the voltage with respect to earth at the tap 8 of the potentiometer 5C. The change in voltage corresponds to a decrease to $(m'_A + m'_B + m_C)$ in the measure provided, so that filling of the tank C continues uninterrupted until the mass $m_C$ of fuel it contains has been brought to a value such that:

$$(m'_A + m_B + m_C) = m_P$$

that is to say, until the total mass contained by the tanks A, B, and C is equal to the desired total.

The fuelling operation described above is completed by the system with the minimum delay. The minimum time with which the operation could be completed is of course that which would be taken if all the tanks A, B, and C were fuelled concurrently without any break in the supply to any tank. However, as referred to above, this cannot be achieved in general since exact information as to the masses which the tanks A and B will hold is not available. Without this information the necessary mass-content of tank C is not known exactly until both tanks A and B have been filled. With the present system as described above, the extra time which after the tanks A and B have been filled is required to bring the content of the tank C to the appropriate mass, is kept to a minimum. This is achieved by ensuring that concurrently with the fuelling of tanks A and B, tank C is fuelled on the basis of the minimum mass which could possibly be required in the tank C, that is to say, initially the aim is to fuel the tank C to a mass $m_C$ given by:

$$m_P - (M_A + M_B)$$

As the tanks A and B become full so the basis of fuelling of the tank C is revised using the information which is then available of the exact values of the masses $m'_A$ and $m'_B$ which are held by the tanks A and B when full. Assuming, as in the above description, that the tank A becomes full before the tank B, the exact information as to the mass $m'_A$ is available and allows the content of the tank C to be brought closer to the required final value by replacing the value of mass $M_A$ in the above expression by the exact value of mass $m'_A$. When the tank B eventually becomes full all the information required for fuelling tank C is available, and the mass of fuel which is to be contained in the tank C is defined exactly by replacing the value of mass $M_B$ by the exact value of mass $m'_B$. The required adjustment in content of the tank C is then solely the addition of a mass $(M_B - m'_B)$, and this involves a minimum delay in completing the fuelling operation.

Although the operation of the system has been described above for the case in which the desired total fuel mass $m_P$ is larger than the value $(M_A + M_B)$ which can possibly be contained by tanks A and B together, the operation of the system is in general principle the same for cases in which the desired mass $m_P$ is less than this value but larger than the value $(M_A)$ which can possibly be contained by the tank A alone. In fact no matter what the value of the desired mass $m_P$ between zero and the total capacity of the group of tanks A, B, and C, the system operates to achieve the required distribution with a minimum possible delay. This is so irrespective of the existing content of the tanks A, B, and C, and can equally-well be applied to off-loading fuel with the minimum delay. Furthermore, by the provision of simple switching circuits the order of preference, as between the tanks A, B, and C and as expressed in the conditions (i) and (ii) quoted above, can be made changeable.

Each of the control units 10A, 10B, and 10C described above may consist simply of a known form of differential electromagnetic relay having two sets of contacts, such relay being responsive to the difference between the two voltages applied to the unit to cause closure of one or the other set of contacts according to which voltage is the larger. The two set of contacts may control respectively the supply of energization currents to the two valves 12 and 13 which are associated with the unit. Means may be provided in the circuit for allowing for variation of the minimum difference in voltage for which each individual set of contacts remains operated, in order that the amount by which the relevant value 12 or 13 is closed prior to voltage-equality is adjustable. This enables compensation to be made for the inherent lag in the system that arises from the fact that the valve takes a finite time to close in response to break in the supply of energization current.

Although in the system which is described above with reference to the drawings, the potentiometers 5 are excited with alternating current it will be appreciated that this is not an essential since the potentiometers 5P, 5A, 5B, and 5C could equally well be excited with direct current scaled in accordance with the values of $M_P, M_A, M_B$, and $M_C$.

We claim:

1. A system for controlling distribution of a load between a plurality of containers, comprising pre-selector means adapted to be set in accordance with a desired total load for the containers, means responsive to the condition in which said pre-selector means is set in accordance with a desired total load exceeding that which will fill a first of the containers to a predetermined limit to effect adjustment of the load-content of said first container towards said limit, and means responsive to the aforesaid condition and also to the condition in which the first container is filled to said limit to effect adjustment of the load-content of a second of the containers towards a first value until said first container is filled to said limit and then towards a second value when said first container is filled to said limit, the said first value being a value which would be appropriate for the load-content of the second container in the event that a predetermined maximum value of load-content applied in respect of the first container, and said second value being the actual value appropriate to the load-content of the second container when the first container is filled as aforesaid.

2. A system according to claim 1 for controlling distribution of the load between three containers at least, including means responsive to the condition in which said pre-selector means is set in accordance with a desired total load exceeding that which will fill the first and second containers to predetermined limits to effect adjustment of the load-content of the third of the three containers towards a first value until one of the first and second containers is filled to its respective limit, then towards a second value until the other of the first and second containers is filled to its respective limit, and then towards a third value which is in general different from either of its first and second values.

3. A system according to claim 2 wherein the first value specified in respect of the third container is a value which is appropriate to the load-content of said third container in the event that predetermined maximum values of load-content applied in respect of the first and second containers respectively.

4. A system according to claim 3 wherein the second value specified in respect of the third container is the value appropriate to the load-content of the third container based on the actual value of load-content of whichever of the first and second containers is the first to fill and the said maximum value of the other.

5. A system according to claim 4 wherein said third value specified in respect of the third container is the actual value appropriate to the load-content of the third container.

6. A system according to claim 1 wherein the load is a liquid load, and the said values are in terms of mass of the liquid.

7. A system according to claim 6 wherein the liquid is liquid fuel and said containers are aircraft fuel tanks.

8. A system for controlling distribution of liquid fuel between at least first and second fuel tanks, comprising: first means which is adapted to be set in accordance with a desired total mass of fuel to be contained by the tanks; second means which is adapted to control supply of fuel to the first tank and which is responsive to the condition in which the first tank is full to break the supply; third means for providing when the first tank is not full a measure of a predetermined maxium mass of the fuel which the first tank can contain, and when the first tank is full a measure of the actual mass of fuel which the first tank contains; fourth means for providing a measure of the actual mass of fuel contained by the second tank; and fifth means responsive to the condition in which the sum of the two masses of fuel which are represented by the two measures actually provided as aforesaid by the third and fourth means respectively is less than the desired total mass which is represented by the setting of said first means, to supply liquid fuel to the second tank.

9. A system for controlling distribution of a load between a plurality of containers, comprising: first means which is settable in accordance with a desired total load to be contained by said containers and which is arranged to provide a signal in accordance with the setting made; second means for providing a measure of the actual content of a first of the containers; third means which is responsive to the signal provided by the first means and the measure provided by the second means to adjust the content of the first container in a sense to reduce towards zero any difference between the actual content of the first container and said desired total load; fourth means which is associated with the first container for supplying a signal in accordance with a value for content of the first container, which value is the value of the actual content of the first container when the first container is full and is otherwise a predetermined value for the maximum possible content of the first container; fifth means for providing a measure of the actual content of a second of said containers; sixth means responsive to the signal supplied by the fourth means and the measure provided by the fifth means to supply a signal in accordance with the sum of the actual content of the second container and the content of the first container as represented by the signal from the fourth means; and seventh means which is responsive to the signals provided by said first and sixth means to adjust the content of the second container in a sense to reduce towards zero any difference between said sum and said desired total load.

10. A system according to claim 9 including: potentiometer means which is supplied with a voltage signal in accordance with said predetermined maximum content of the first container; switch means having a first condition in which it selects the voltage signal supplied to the potentiometer means and a second condition in which it selects a voltage signal derived by said tap; and means for switching said switch means from its first condition to its second condition upon the first container becoming full.

11. A system according to claim 10 including: further potentiometer means which is supplied with a voltage signal in accordance with a predetermined value for the maximum content of the second container, and which has a movable tap; means for setting the tap of said further potentiometer means in accordance with the actual content of the second container; and means for adding a signal derived at the tap of said further potentiometer means to the signal selected as aforesaid by said switch means.

12. A system according to claim 9 including: means to provide a measure of the actual content of a third said container; means to provide a signal in accordance with a value for the content of the first and second containers together, which value is the value of said sum when the second container is full and is otherwise the sum of a predetermined value for the maximum possible content of said second container and the value of the content of the first container as represented by the signal from said fourth means; means to provide in response to said measure of the actual content of the third container and said signal in accordance with a value for the content of the first and second containers a signal in accordance with the sum of the last-said value and the value of the actual content of the third container; and means responsive to this latter signal and the signal provided by said first means to adjust the content of the third container in a sense to reduce towards zero any difference between said desired total load and the value for the total content of the first, second, and third containers represented by the said latter-signal.

13. A system according to claim 9 wherein said values are in terms of mass.

14. A system according to claim 9 wherein the load is a load of liquid fuel.

15. In an aircraft, a system according to claim 14 for controlling the distribution of the liquid fuel between fuel tanks of the aircraft.

No references cited.

WILLIAM F. O'DEA, *Primary Examiner.*

H. M. COHN, *Assistant Examiner.*